UNITED STATES PATENT OFFICE.

LUDWIG RAPPEPORT, OF VIENNA, AUSTRIA-HUNGARY.

PROCESS FOR THE PRODUCTION OF MEAL FROM WHEAT AND OTHER FARINACEOUS PRODUCTS OF POOR BAKING QUALITY.

No. 839,889.

Specification of Letters Patent.

Patented Jan. 1, 1907.

Application filed August 31, 1905. Serial No. 276,639.

*To all whom it may concern:*

Be it known that I, LUDWIG RAPPEPORT, merchant, a subject of the Emperor of Austria-Hungary, residing at Vienna, in the Province of Lower Austria and Empire of Austria-Hungary, have invented new and useful Improvements in a new or improved Process for the Production of Meal from Wheat and other Farinaceous Products of Poor Baking Quality, of which the following is a specification.

This invention relates to a new or improved process for the production of meal of good baking quality from wheat and other farinaceous products of poor baking quality.

Farinaceous fruits and grain grown in certain kinds of soil and under the influence of certain climates supply meal which is under ordinary conditions either of inferior baking quality or quite incapable of being baked. This is more particularly the case with wheat.

The object of the present invention is to obviate this disadvantage by means of the action of enzyms, the treatment adapted for this purpose being, moreover, also adapted to improve the baking quality of high-class grain. The manner in which the enzym action is caused to take place is as follows:

For the purpose of the improved process wheat of the finest quality or any other suitable product rich in proteids is caused to germinate in a suitable manner in order to produce malt of very considerable diastatic energy, such as has not hitherto been used in practice (fermenting capacity according to Lintner 108° to 200°.) This malt, in which all the enzyms of the grain are developed, is added to the extent of approximately one per cent. or less in dry state to the grain to be ground. The product to which this addition is made may be of inferior baking quality. The malt is directly added to the grain or the like before the latter is ground. In this manner the small addition of malt becomes intimately and uniformly mixed with the flour produced in the grinding operation. With the improved process the grinding operation already renders the grain suitable for the use of the baker, and the meal need not be subjected to a subsequent artificial treatment, which would not be capable of imparting to it baking qualities equal to those obtained by the improved method.

The action of the enzyms added in the manner described not only results in increasing the nutrition of the yeast and producing energetic fermentation, but also favorably modifies the glutinous proteids. The baking capacity of the meal is thus considerably increased, whereby also a better yield of bread is obtained, and the flavor and digestibility of the bread are also improved.

It is obvious that besides wheat any other farinaceous grain or fruit could be treated in the manner described for the purpose of improving the baking properties of the meal obtained therefrom.

I am aware that it is known to treat grain with malt or to add malt to flour or dough and that it is also known to treat bran separated from the grain in the milling process with malt and add said malted bran to the flour; but all these known processes differ from the present invention as well by the objects in view as by the distinguishing features serving to attain said objects, the known processes consisting all in employing ordinary malt in such a considerable quantity as to alter not only the qualities, (especially the digestive and nutritive qualities,) but also the taste of the treated cereal or the food prepared therefrom. My process is distinguished from all known processes by the fact that but an exceedingly small quantity (one per cent. or less) of a special and new kind of malt of the highest diastatic power (180° to 200° according to Lintner) is added in dry state immediately to the grain and ground with the same. In this way grain of no or poor baking quality is made capable of being easily baked without imparting to the food prepared from flour of this kind any taste of malt or changing in the least the taste by such addition of malt.

Having now described my invention, what I claim, and desire to secure by Letters Patent of the United States, is—

Process for producing meal of good baking quality from wheat or other farinaceous cereals of poor baking quality, or for improving the baking quality of meal, consisting in adding to the wheat or other cereal malt of considerable diastatic energy, derived from wheat or other suitable products rich in proteids, said malt being used in a quantity restricted to a maximum of one per cent. and being ground with said wheat or other cereal, so as to uniformly distribute the active active enzyms of the malt in the meal during the production of the latter, without affecting taste and appearance.

In testimony whereof I have signed my name to this specification in the presence of two subscribing witnesses.

LUDWIG RAPPEPORT.

Witnesses:
 HANS PAPPENHEIM,
 ALVESTO S. HOGUE.